UNITED STATES PATENT OFFICE.

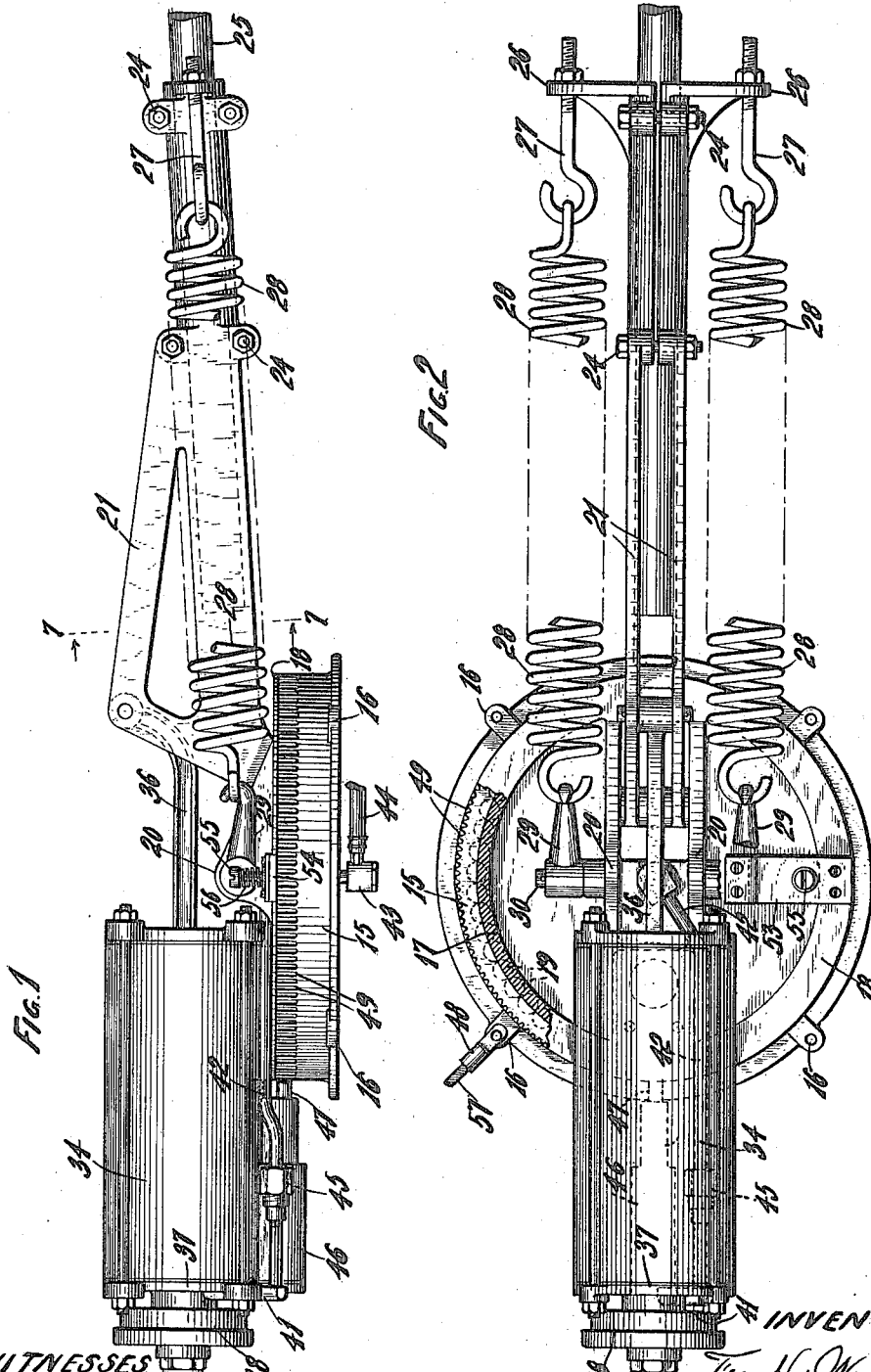

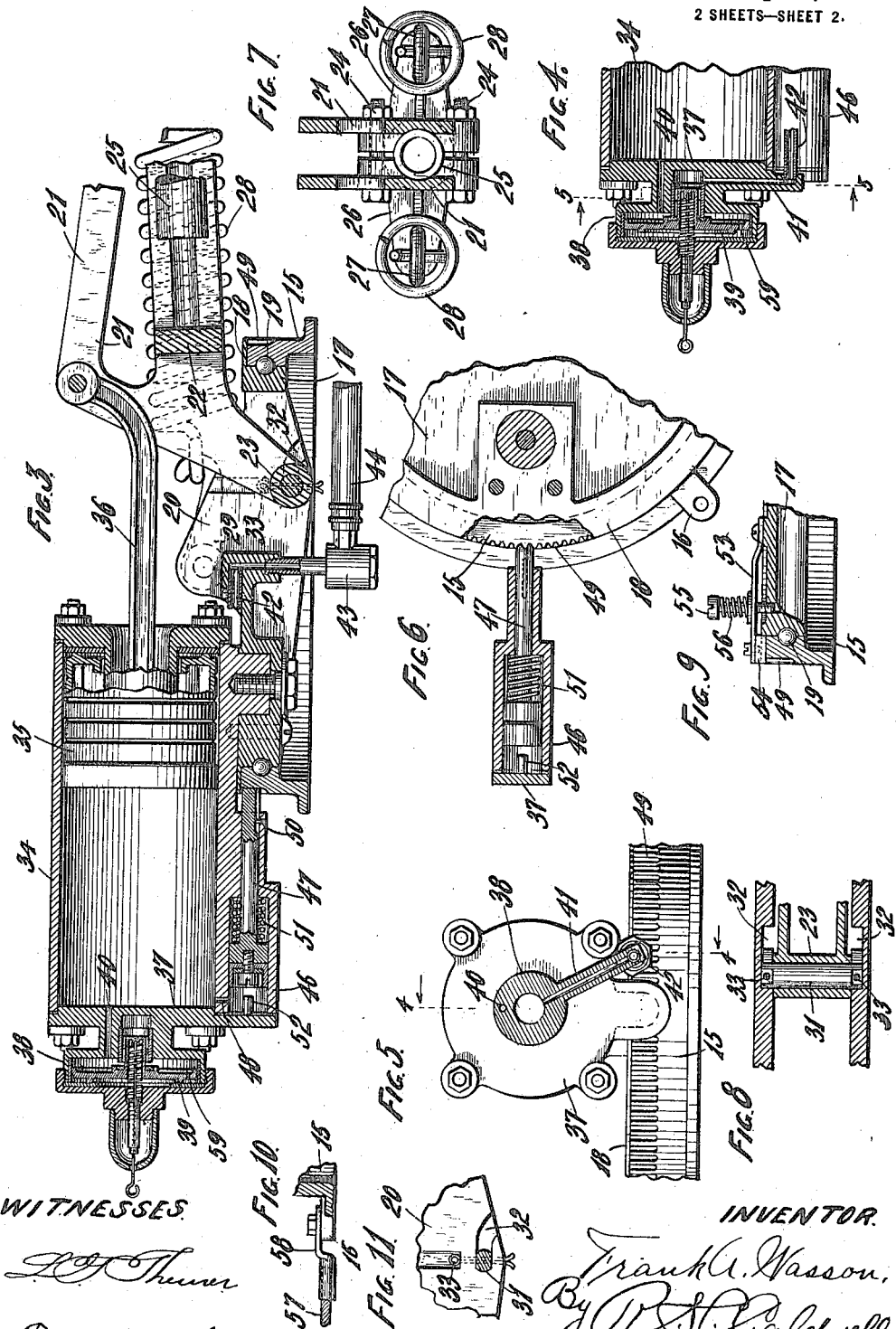
F. A. WASSON.
TROLLEY.
APPLICATION FILED AUG. 11, 1915.
1,221,249.
Patented Apr. 3, 1917.
2 SHEETS—SHEET 2.

FRANK A. WASSON, OF MILWAUKEE, WISCONSIN, ASSIGNOR TO WASSON ENGINEERING AND SUPPLY COMPANY, OF SANTA ROSA, CALIFORNIA, A CORPORATION OF CALIFORNIA.

TROLLEY.

1,221,249.

Specification of Letters Patent.

Patented Apr. 3, 1917.

Application filed August 11, 1915. Serial No. 44,850.

*To all whom it may concern:*

Be it known that I, FRANK A. WASSON, a citizen of the United States, and resident of Milwaukee, in the county of Milwaukee and State of Wisconsin, have invented new and useful Improvements in Trolleys, of which the following is a description, reference being had to the accompanying drawings, which are a part of this specification.

This invention has for its object to provide a trolley for use on electric railway cars which, besides being automatically retrieved by air pressure when the trolley arm leaves the wire, is prevented from turning on its axis of rotation so as to avoid the possibility of the retrieved trolley arm swinging out to the side of the car where it may strike against poles or other obstructions along the side of the track with possible injury to the trolley when the car is running at high speed.

With this object in view the invention contemplates the use of a brake operated by the movements of the trolley arm on leaving the wire or upon being retrieved, and preferably by means of air pressure, said brake serving to lock the trolley base against turning so that when the trolley is retrieved it is held in a fixed position and is incapable of swinging out to the side of the car.

Another object of the invention is to improve upon the general construction of the trolley whereby it may be strengthened and made more readily adjustable as to the length of the arm, and whereby the ball bearing for the rotatable base may be relieved of the burden of carrying the current and thereby prolong the life of the bearing.

With the above and other objects in view the invention consists in the trolley as herein claimed, and all equivalents.

Referring to the accompanying drawings, in which like characters of reference indicate the same parts in the different views, Figure 1 is a side view of a trolley constructed in accordance with this invention;

Fig. 2 is a plan view thereof with parts broken away;

Fig. 3 is a central sectional view thereof with the automatic valve in its open position;

Fig. 4 is a similar view thereof with the valve in its closed position, and showing the air passageway leading thereto, being taken on the line 4—4 of Fig. 5;

Fig. 5 is an end view thereof on the plane of line 5—5 of Fig. 4;

Fig. 6 is a sectional plan view showing the brake member engaging the stationary base;

Fig. 7 is a sectional view on the plane of line 7—7 of Fig. 1;

Fig. 8 is a horizontal detail sectional view showing the pivotal connection for the trolley arm holder;

Fig. 9 is a sectional view showing the spring brush connection for carrying the current around the ball bearing of the base; and, Fig. 10 is a detail view showing the lead wire connection for the base ring;

Fig. 11 is a detail view of the pivotal connection shown in Fig. 8.

In these drawings 15 indicates a stationary base ring which is provided with apertured lugs 16 by means of which it may be bolted to the car roof. A disk-shaped rotary base 17 fits within the upper portion of the base ring 15 and at its upper edge has an outwardly extending flange 18 to prevent water and dirt from entering the space between the base and the ring where a ball bearing 19 is located, with the raceway formed partly in the base and partly in the ring. A pair of parallel vertical cheeks 20 are formed on the base 17 at the edges of an opening in the base and these cheeks extend above and below the plane of the disk-like portion of the base. Passing through the opening in the base and pivotally connected to the cheeks 20 near their lower edges is a trolley arm holder 21 which comprises a pair of triangular side members formed integral with each other through a connecting web 22 at their triangular portions and a tubular bearing connection 23 at one end which forms the pivotal connection in a manner that will be later described. The other ends of these integral triangular side members of the trolley arm support are grooved to form complementary semi-tubular sections so that together they constitute in effect a long tubular socket split above and below and held together by clamping bolts 24 by means of which they may be tightened around the end of trolley arm 25 which may telescope within this tubular socket to a greater or less extent according to the desired adjustment of the trolley arm for length. The trolley arm carries the trolley wheel as usual, but its upper end is not shown, as it is not necessary to an understanding of the present invention. Bracket ears 26 extend in opposite directions from the outer end of the respective sections of the trolley arm holder and have hooks 27 secured thereto, and a pair of heavy coil springs 28 have their ends engaged in these hooks and their other ends engaged with hooks 29 which are pivotally mounted on a pin 30 projecting from the upwardly extending portions of the cheeks 20. The springs 28 thus serve to give the trolley arm a tendency to swing upwardly and hold the trolley wheel firmly in contact with the trolley wire.

The pivotal connection for the trolley arm holder, as best seen in Figs. 3 and 8, is formed by a pin 31 loosely fitting within the sleeve 23 with its ends projecting from said sleeve and flattened above and below to fit within grooves 32 in the inner faces of the cheeks 20 which are narrower than the width of the pin to keep the pin from turning. Cotter pins 33 passing through the flattened ends of the pin 31 and through the walls of said grooves prevent the pin from backing out of the grooves. Thus the trolley arm holder is pivotally mounted on the pin and can be readily detached when desired by removing the cotter pins and sliding the pin out of the grooves.

A cylinder 34 is rigidly secured to the rotary base member 17, and a piston 35 working therein has a bent connecting rod 36 pivotally connected with the angular portion of the trolley arm holder 21. The cylinder head 37 carries a valve chamber 38 containing an automatic controlling valve 39, such as covered by my co-pending application Serial No. 767,016, which controls the admission of compressed air to the cylinder from a suitable connection with an air reservoir or other source of supply of compressed air, not shown. A passageway 40 connects the valve chamber 38 with the interior of the cylinder and through it passes the air which is compressed in the cylinder by the quick movement of the piston when the trolley leaves the wire. This passageway also admits compressed air to the cylinder when the automatic valve 38 is opened as the result of the pressure received from the cylinder in this manner. A compressed air passageway 41 leads through the cylinder head 37 to the valve chamber within the valve seat thereof so that its connection with the interior of the cylinder through the passageway 40 is closed when the valve is seated and the end of this passageway is connected by a pipe 42 with a swiveled air pipe connection 43 on the rotary base 17 in the center thereof and an air pipe 44 from this connection 43 leads to the compressed air reservoir or other source of supply of compressed air. By means of the swiveled connection in the air conductor the trolley base may be permitted to turn freely without disturbing the air connection. The air pipe 42 is provided with a union 45 to permit the cylinder and its piston to be disconnected when desired without affecting the other parts.

A brake cylinder 46, preferably cast integral with the cylinder 34 and closed at its end by a projection on the cylinder head 37 contains a spring retracted plunger 47 with its stem passing out through a guide in the end of the cylinder to engage the edge of the stationary base ring 15, and said plunger is forced outwardly by compressed air admitted to the cylinder 46 from the cylinder 34 through a passageway 48 connecting them. The end of the plunger stem is preferably toothed or serrated to positively engage with teeth or serrations 49 in the edge of the base ring 15, and the plunger is kept from turning by means of a pin 50 in its guide projecting into a longitudinal groove of the pin. The spring 51 for retracting the plunger is a coil spring contained in the cylinder 46 surrounding the stem of the plunger and bearing at its ends against the end of the cylinder and the head of the plunger respectively. When the plunger is not under the influence of compressed air from the cylinder 34 the spring 51 moves it out of engagement with teeth 49 and against a stop lug 52 on the cylinder head 37 which keeps the head of the plunger from closing the opening 48. In any position of the trolley base the admission of compressed air to the brake cylinder 46, either by the movements of the piston 35 incident to the trolley leaving the wire, or by the opening of the automatic valve 39, the plunger is forced thereby against the action of its spring and into engagement with the teeth 49 of the stationary base ring, thus locking the trolley base in its position and preventing it from turning from any cause so as to endanger the trolley arm by allowing it to project to the side of the car.

In order to relieve the ball bearing 19 from the duty of carrying the current a spring arm 53 is secured to the base member 17 and carries a contact shoe 54 at its end which works through an opening in the flange 18 and engages the top surface of the base ring 15, there being an adjusting screw 55 passing through an opening in the spring arm 53 and threaded in the base 17 and surrounded by a coil spring 56 to enable the pressure of the contact to be adjusted as desired. From the base ring 15 the current is conducted through a lead wire 57 having its flat terminal 58 clamped against one of the feet 16 of said base ring by one of the bolts which secure the base ring to the roof of the car.

In operation the brake is ineffective during the normal operation of the trolley, the spring 51 holding the plunger in its retracted position out of engagement with the base ring, and the trolley base is, therefore, able to turn freely to permit the trolley arm to swing as required to maintain connection with the trolley wire. The ordinary vertical swing of the trolley arm in following the curvature of the trolley wire between the points of suspension thereof is permitted without affecting the operation of the automatic valve 39 or the brake plunger 47 by reason of a vent opening 59 in the automatic valve through which the breathing incident to the slow pulsations of the piston takes place, but upon the occurrence of a sudden movement of the trolley arm, as when the trolley wheel leaves the wire, the sudden compression of air in the cylinder 34 communicated through the opening 48 to the plunger 47 forces said plunger against the pressure of its spring 51 and into engagement with the teeth 49 of the stationary base ring, thus locking the trolley base against rotary movement, and at the same time this sudden compression of air opens the automatic valve 39 and admits compressed air to the cylinder 34 to retrieve the trolley and to continue the locking engagement of the brake 47. The closing of the supply of compressed air to the cylinder 34, which is performed by operating a valve in the compressed air supply pipe 44, and the consequent exhaust of pressure in the cylinder through the vent opening 59 not only permits the springs 28 to raise the trolley arm, but permits the spring 51 to remove the brake plunger 47 to unlock the trolley base and allow it to freely turn for restoring the trolley to the wire. It is obvious that instead of the roughened or toothed surfaces forming a positive engagement between the brake plunger 47 and the stationary base ring 15 ordinary frictional surfaces may be relied upon to prevent the turning of the trolley base, but the toothed engagement is preferred as being more positive in its action. The trolley base being locked when the trolley is retrieved, there is no danger of the trolley arm being swung by centrifugal force when the car is turning a curve, or from any other cause, and the trolley arm is thus protected against swinging out over the side of the car where it might engage poles or other obstructions along the track.

The parts are so designed as to permit of ready removal for inspection or repair, though being strong and durable and protected from injury or obstruction, so as to remain efficient in all weather, and without destruction of the ball bearing by the passage of the current therethrough, the adjustable spring brush serving to conduct the current around the ball bearing to the contact surface of the base ring which is protected by the flange 18.

What I claim as new and desire to secure by Letters Patent is:

1. In a trolley, a stationary base, a rotary base mounted thereon, a spring actuated trolley arm holder pivotally mounted on the rotary base, and pneumatic means actuated by a sudden upward movement of the trolley arm holder, as when the trolley leaves the wire, for preventing the rotary movements of the rotary base.

2. In a trolley, a rotary base, a suitably actuated trolley arm pivotally mounted on the rotary base, and fluid pressure means actuated by a sudden movement of the trolley arm, as upon the trolley leaving the wire, for preventing the rotary movements of the base.

3. In a trolley, a stationary base, a rotary base mounted thereon, a suitably actuated trolley arm pivotally mounted on the rotary base, and fluid pressure operated means carried by the rotary base for engaging the stationary base to prevent movements of the rotary base and actuated by a sudden movement of the trolley arm, as upon the trolley leaving the wire.

4. In a trolley, a stationary base, a rotary base mounted thereon, a trolley arm pivotally mounted on the rotary base, a brake cylinder mounted on the rotary base, a plunger working therein and adapted to engage the stationary base, and means actuated by a sudden movement of the trolley arm, as upon the trolley leaving the wire, for supplying compressed air to the brake cylinder to effect the engagement of the plunger with the stationary base.

5. In a trolley, a stationary base, a rotary base mounted thereon, a spring actuated trolley arm pivotally mounted on the rotary base, an air cylinder carried by the rotary base, a piston working therein and having connection with the trolley arm, a brake cylinder communicating with the air cylinder, and a plunger working in the brake cylinder and adapted to engage the stationary base for locking the rotary base upon the occurrence of a sudden movement of the trolley arm, as upon the trolley leaving the wire.

6. In a trolley, a stationary base, a rotary base mounted thereon, a spring actuated trolley arm pivotally mounted on the rotary base, an air cylinder carried by the rotary base, a piston working therein and connected with the trolley arm, a brake cylinder carried by the rotary base and communicating with the air cylinder, a spring retracted plunger in the brake cylinder, a guide for the plunger stem preventing the plunger from turning, teeth on the end of the plunger stem, and coöperating teeth on the stationary member engaged thereby when the plunger is operated by compressed air from the air cylinder incident to a movement of the piston when the trolley arm makes a sudden movement, as upon the trolley leaving the wire.

7. In a trolley, a stationary base, a rotary base mounted thereon, a spring actuated trolley arm pivotally mounted on the rotary base, an air cylinder carried by the rotary base, a piston working therein and connected with the trolley arm, an automatic valve controlling the admission of compressed air to the air cylinder and actuated by compression in the air cylinder incident to a sudden movement of the piston, as when the trolley leaves the wire, a brake cylinder carried by the rotary base and communicating with the air cylinder, and a plunger working in the brake cylinder and adapted to engage the stationary base to prevent the turning of the rotary base during conditions of abnormal pressure within the air cylinder.

8. In a trolley, a stationary base, a rotary base mounted thereon, a spring actuated trolley arm pivotally mounted on the rotary base, a brake cylinder carried by the rotary base, a plunger working therein and adapted to engage the stationary base, means for supplying compressed air to the brake cylinder, and an automatic valve for controlling the supply of compressed air to the brake cylinder and actuated by a sudden movement of the trolley arm, as upon the trolley leaving the wire.

9. In a trolley, a stationary base, a rotary base mounted thereon, a spring actuated trolley arm pivotally mounted on the rotary base, an automatic compressed air retrieving means for lowering the trolley arm upon the occurrence of a sudden movement thereof, as when the trolley leaves the wire, a brake cylinder carried by the rotary base and having communication with the compressed air retrieving means to receive compressed air therefrom, and a plunger in the brake cylinder actuated by the compressed air and adapted to engage the stationary base to prevent movements of the rotary base.

10. In a trolley, a stationary base, a rotary base mounted thereon, a trolley arm pivotally mounted on the rotary base, a brake cylinder mounted on the rotary base, a plunger working therein and adapted to engage the stationary base, a means actuated by a sudden movement of the trolley arm, as upon the trolley leaving the wire, for supplying pressure fluid to the brake cylinder to effect the engagement of the plunger with the stationary base.

In testimony whereof, I affix my signature in presence of two witnesses.

FRANK A. WASSON.

Witnesses:
R. S. C. CALDWELL,
KATHERINE HOLT.

Copies of this patent may be obtained for five cents each, by addressing the "Commissioner of Patents, Washington, D. C."